US008047188B2

(12) United States Patent
Gibson et al.

(10) Patent No.: US 8,047,188 B2
(45) Date of Patent: Nov. 1, 2011

(54) DIRECT-START ENGINE OPERATION UTLIZING MULTI-STRIKE IGNITION

(75) Inventors: Alex O'Connor Gibson, Ann Arbor, MI (US); Jianwen James Yi, Canton, MI (US); Brad Alan VanDerWege, Canton, MI (US); Joseph Norman Ulrey, Dearborn, MI (US); Cindy Zhou, Canton, MI (US); Steven Todd Wooldridge, Saline, MI (US); David Reiche, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/915,666

(22) Filed: Oct. 29, 2010

(65) Prior Publication Data

US 2011/0041801 A1    Feb. 24, 2011

Related U.S. Application Data

(63) Continuation of application No. 12/474,085, filed on May 28, 2009, now Pat. No. 7,827,975.

(51) Int. Cl.
*F02P 15/08* (2006.01)
(52) U.S. Cl. .................. 123/636; 123/179.3; 123/179.5; 123/339.11; 123/406.25; 123/406.53
(58) Field of Classification Search ........... 123/636, 123/179.3, 179.4, 179.5, 481, 198 DB, 198 DC, 123/198 F, 339.11, 299, 300, 305, 406.25, 406.5, 406.53, 406.54, 406.55, 637; 701/112, 113

See application file for complete search history.

(56) References Cited

U.S. PATENT DOCUMENTS

| 6,843,222 | B2 | 1/2005 | Sieber et al. |
| 6,895,933 | B2 | 5/2005 | Miwa et al. |
| 7,096,840 | B2 | 8/2006 | Asada et al. |
| 7,233,856 | B2 | 6/2007 | Yuya et al. |
| 7,258,099 | B2 | 8/2007 | Yoshida et al. |
| 7,415,955 | B2 | 8/2008 | Matsuki et al. |
| 7,458,353 | B2 | 12/2008 | Takahashi |
| 7,472,688 | B2 | 1/2009 | Nakauchi et al. |
| 7,647,914 | B2 | 1/2010 | Kim et al. |
| 7,827,975 | B1 * | 11/2010 | Gibson et al. ............ 123/636 |
| 2006/0021607 | A1 | 2/2006 | Toriyama |
| 2006/0196460 | A1 | 9/2006 | Ohtsu et al. |
| 2008/0092841 | A1 | 4/2008 | Takahashi |
| 2008/0201064 | A1 | 8/2008 | DiGonis |
| 2009/0271095 | A1 | 10/2009 | Kojima |
| 2010/0042311 | A1 | 2/2010 | Nakai |

* cited by examiner

*Primary Examiner* — Hai Huynh
(74) *Attorney, Agent, or Firm* — Allan J. Lippa; Alleman Hall McCoy Russell & Tuttle LLP

(57) ABSTRACT

A method for engine starting is provided. The method may include performing idle-stop operation, and during a subsequent re-start, applying multi-strike ignition operation for a first combustion cycle. In this way, improved engine starting may be achieved with reduced emissions.

19 Claims, 5 Drawing Sheets

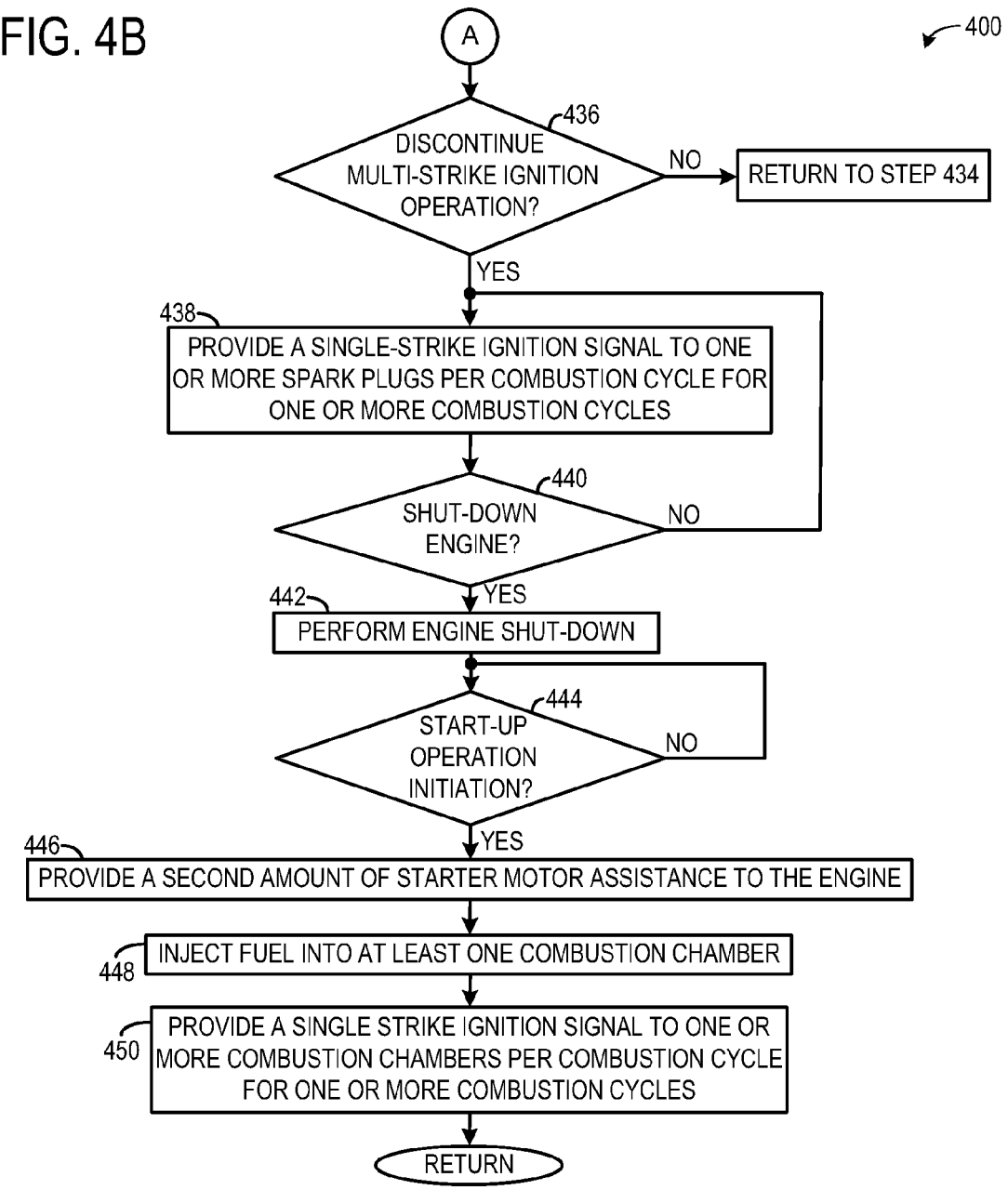

US 8,047,188 B2

DIRECT-START ENGINE OPERATION UTLIZING MULTI-STRIKE IGNITION

CROSS REFERENCE TO RELATED APPLICATIONS

The present application is a continuation of U.S. patent application Ser. No. 12/474,085 filed May 28, 2009, the entire contents of which are incorporated herein by reference.

BACKGROUND AND SUMMARY

A variety of control strategies have been developed to decrease the fuel consumption within an internal combustion engine. One type of control strategy may include temporarily shutting down operation of an internal combustion engine during idle-stops and quickly restarting the engine, when needed, in an attempt to decrease fuel consumption and well as emissions from the vehicle. In one example, a direct-start (DS) control strategy may be used when restarting the engine from idle-stop conditions, where a first combustion event of the start occurs while the engine is still at rest, with or without starter motor assistance. Vehicles utilizing DS may shut down operation while a vehicle is stopped from an idle condition via the discontinuation of fuel injection, valve actuation, and/or spark discharge within the combustion chambers. Subsequent to engine shut-down, fuel may be injected into to a selected combustion chamber and ignited via a spark discharge to quickly and seamlessly re-start combustion within the engine, in an attempt to reduce fuel consumption as well as emissions during start-up.

However, the Applicants have recognized that vehicles utilizing DS may experience misfires, variable torque output, and in some cases increased emissions during DS operation, due to the variable and unpredictable position of the piston as well as the improperly mixed air and fuel and the motion of the ignitable mixture within the combustion chamber. In particular, the position of the first piston selected for DS from rest may be proximate to the top dead center (TDC) of the combustion chamber, which may in turn lead to an inconsistent mixing of the air and fuel and incomplete combustion. The incomplete and inefficient combustion may cause the aforementioned problems (e.g. misfires and variable torque output). Furthermore, the noise, harshness, and vibration (NVH) within the vehicle may be exacerbated due to the variable torque output, decreasing customer satisfaction.

A method for operation of a vehicle having an internal combustion engine is provided. The internal combustion engine may include one or more combustion chambers, a fuel delivery system including a direct fuel injector coupled to each combustion chamber, an ignition system including one or more spark plugs coupled to each combustion chamber, a piston disposed within each combustion chamber, and an intake and an exhaust valve coupled to each combustion chamber, the internal combustion engine providing motive power to the vehicle. The method may include discontinuing combustion operation within the internal combustion engine responsive to idle-stop operation. The method may further include, during a direct-start, performing multi-strike ignition operation per combustion cycle via one or more selected spark plug(s) for at least a first combustion cycle in a combustion chamber following the discontinuation of combustion operation, the one or more selected spark plug(s) coupled to the combustion chamber.

In this way, emissions and variable torque output during DS may be reduced and in some examples prevented, due to the increased combustion stability of a multi-strike ignition operation.

Another method of operation of a vehicle having an internal combustion engine is provided, in other examples. The method may include, during a first start, when a duration following idle-stop operation is below a threshold value, directly starting the engine from rest with a first combustion event including multi-strike ignition operation per combustion event, where a first amount of starter motor assistance to the engine is provided. The method may further include during a second start, when the temperature of the engine is below a threshold value and/or an operator initiated ignition signal has been received via the vehicle, starting the engine from rest with a second combustion event including only a single strike ignition operation per combustion event, where a second amount of starter motor assistance to the engine is provided, the second of starter motor assistance greater than the first amount of starter motor assistance.

In this way, during a direct start when the starter is used to a lesser extent, or not at all, additional current from the vehicle electrical storage (e.g., battery) is available for the multi-strike operation. However, when additional energy is needed to power the increased starter assistance, less current from the vehicle electrical storage (e.g., battery) is needed for the single strike ignition. In this way, it is possible to balance current draw during starts, while at the same time take advantage of the increased current availability of direct starts to enable multi-strike ignition operation. Likewise, when additional starter motor assistance is used, less current is used for single-strike ignition.

It should be understood that the background and summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A and 4B illustrate a control strategy that may be used to temporarily shut down and directly restart combustion operation within an internal combustion engine.

DETAILED DESCRIPTION

Figure 1:
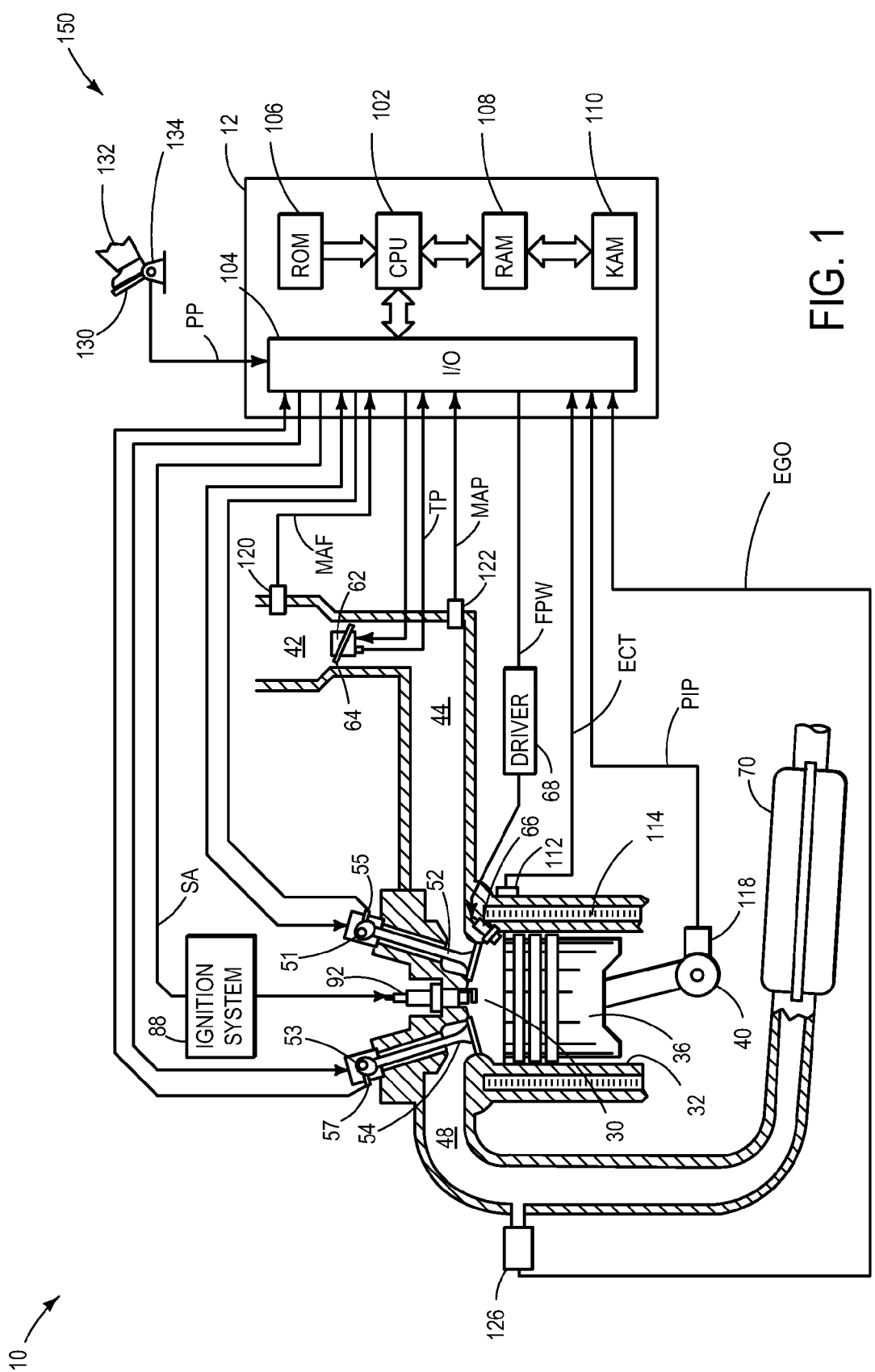
FIG. 1 is a schematic diagram of an internal combustion engine.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. In this example VCT is utilized. However, in other examples, alternate valve actuation systems may be used, such as electronic valve actuation (EVA) may be utilized. The position of intake valve 52 and exhaust valve 54 may be determined by position sensors 55 and 57, respectively.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark. Various spark ignition signals are depicted in FIGS. 3A-3I, discussed in greater detail herein.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. Controller 12 may be included in control system 150, described in more detail herein.

As described above, FIG. 1 shows only one cylinder of a multi-cylinder engine, and that each cylinder may similarly include its own set of intake/exhaust valves, fuel injector, spark plug, etc.

Figure 2:
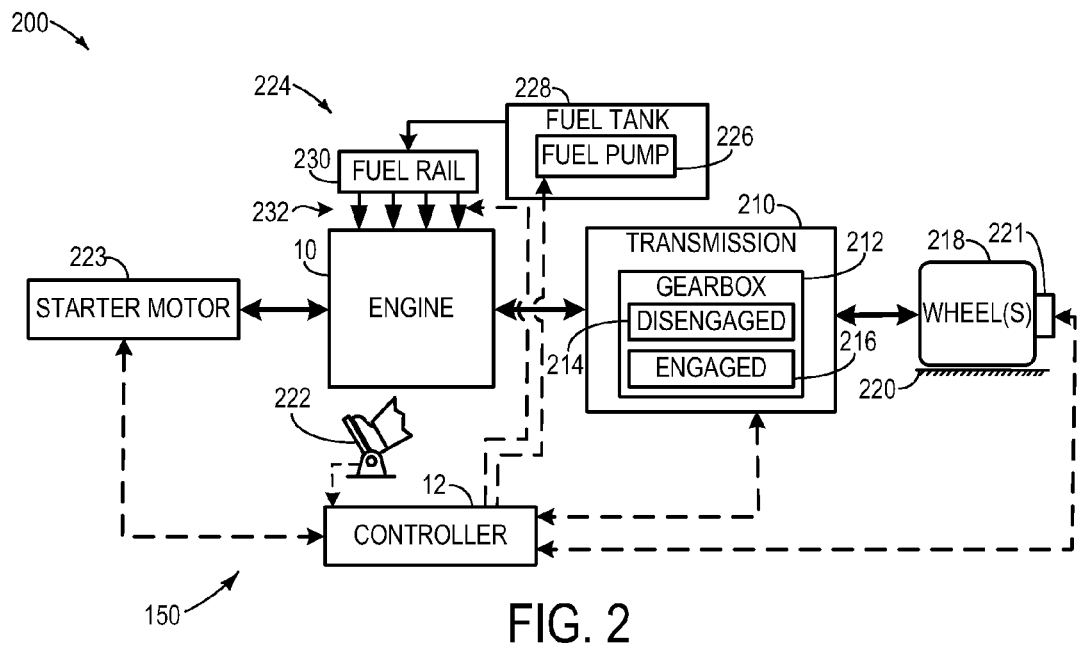
FIG. 2 shows a schematic diagram of a vehicle having an engine, a transmission, and a fuel delivery system.

FIG. 2 illustrates vehicle 200 including engine 10 and an associated transmission 210 operably coupled thereto. The transmission may be a suitable transmission such as an automatic transmission, a manual transmission, a continuously variable transmission, a discrete automatic transmission, etc. In this example, the transmission includes a gearbox 212. The gearbox may be arranged in a multitude of configurations, such as a disengaged (e.g. neutral) configuration 214 in which the gears are not engaged with the crankshaft and an engaged (e.g. drive) configuration 216 in which the gears are engaged with the crankshaft. Disengaged configuration 214 may be used during periods of idle-stop operation. Idle-stop operation may include a mode of vehicle operation in which the vehicle is idling and/or the speed of the vehicle is below a threshold value (e.g. substantially zero). Likewise, engaged configuration 216 may be used to propel the vehicle via one or more wheels 218 along a road surface 220. It will be appreciated that numerous alternative or additional gear configurations are possible. For example, a manual transmission may have a discrete number of user adjustable configurations (e.g. 5 speed, 6 speed, etc.).

One or more braking mechanism(s) 221 may also be coupled to the wheel(s). Likewise, the braking mechanism may be coupled to controller 12. Furthermore, a brake pedal 222 or other suitable input device may be electronically coupled to the controller. The brake pedal may be configured to actuate braking mechanism(s) 221.

Additionally, a starter-motor 223 may be coupled to engine 10, as depicted. The starter-motor may be configured to initiate rotation of the crankshaft during a start-up to initiate combustion. Thus, the starter motor may provide an amount of assistance to the engine. In some examples, the amount of assistance may correspond to an amount of energy provided to the starter motor and/or the duration of time over which the energy is provided. It will be appreciated that operation of the starter motor may be inhibited under certain operating conditions. Controller 12 may be coupled to both starter-motor 223 and transmission 210. In some examples, the control may be configured to inhibit operation of the starter-motor. Additionally, the controller may be configured to determine and/or adjust the configuration of the transmission.

A fuel delivery system 224 may be coupled to engine 10. The fuel delivery system may include a fuel pump 226 (e.g. lift pump) disposed within a fuel tank 228. Fuel pump 226 may be electronically coupled to controller 12, in some examples. Furthermore, the fuel pump may be fluidly coupled to a fuel rail 230. The fuel rail may be coupled to a plurality of fuel injectors 232. The plurality of fuel injectors may include fuel injector 66. In some examples, at least a portion of the fuel injectors may be direct fuel injectors. It will be appreciated that additional components may be included in the fuel delivery system, such as a high pressure pump, a fuel filter, a return-less fuel circuit, etc.

Control system 150 may include controller 12 as well as various associated actuators, illustrated in both FIG. 1 and FIG. 2. The actuators may be coupled to the spark plugs, the intake and the exhaust valves, the fuel delivery system, etc., included in engine 10. Additionally, control system 150 may be configured to directly start engine 10. A direct-start may be implemented to quickly restart the engine from rest subsequent to a discontinuation of combustion operation. The discontinuation of combustion operation may be implemented in response to idle-stop operation. Discontinuation of combustion operation may include substantially inhibiting one or more of fuel injection, spark discharge within the combustion chamber, and intake and/or exhaust valve actuation. Furthermore, a direct-start may be implemented in response to a request for torque from an input device, such as a gas pedal, in some examples. Alternatively, combustion operation may be initiated when a brake pedal (e.g. brake pedal 222) or other suitable input device is released. In this way, the engine may be shut-down when motive power is not needed and automatically restarted when an operator makes a request for motive power, thereby decreasing gas mileage. It will be appreciated that direct-starting may be inhibited when engine 10 is below a threshold temperature, in some examples. Additionally or alternatively, direct-starting may be inhibited when a threshold time interval, which may be predetermined, initiated in response to discontinuation of combustion operation, has been reached or surpassed.

It may be desirable to decrease and in some examples minimize the duration of a direct-start, thereby improving the responsiveness of the vehicle via a decrease in a delay between a torque request and a torque output. In one example, multi-strike ignition operation, particularly in the first combustion event of a cylinder, including the cylinder having the first combustion event from rest of a direct-start, can be used to improve combustion during the direct-start. Specifically, due to the improperly mixed air and fuel and the motion of the ignitable mixture within the combustion chamber during a direct-start, the multi-strike ignition signal may increase the amount of air-fuel combusted within the combustion chamber, when compared to a single strike ignition operation. Consequently, the variation in the torque output and the vehicle emissions during at least the first combustion cycle, from rest, may be reduced when a multi-strike ignition operation is provided during a direct-start. Furthermore, this problem can be exacerbated due to the short duration of the direct-start making it difficult to precisely deliver an ignition signal at an appropriate time to facilitate efficient combustion. While the multi-strike ignition may improve combustion, it can also increase current draw on the vehicle battery. However, during direct-start, where in some example no or substantially reduced starter motor assistance is provided, additional current is available from the battery.

Therefore, to decrease the duration of a direct-start, a fuel and spark ignition signal may be provided to a selected combustion chamber having a piston disposed within, the selection of the combustion chamber based on the piston's position at rest before rotation. In some examples, a multi-strike ignition signal may be provided to a selected combustion chamber to decrease the start time and increase combustion stability. Specifically, a combustion chamber having a piston with a resting position closer to the top dead center (TDC) of the combustion chamber than the resting position of the other pistons in the engine may be selected, in some examples. A resting position may include a position of the piston while the piston's speed is below a threshold value (e.g. substantially zero). The resting position of the piston may be determined prior to a direct-start when the speed of the piston is below a threshold value (e.g. at rest), prior to engagement of a starter-motor, a fuel injection event, and/or an ignition event. Thus, the duration of the direct-start may be decreased. However, alternate techniques may be used to select the combustion chamber, in other examples.

It has been found, that the resting position of the piston closest to TDC may be described by equation 1.

$$\text{piston position} \leq \frac{720}{\#ofcylinders}(\text{degrees from }TDC) \qquad (1)$$

It will be appreciated that alternate equation may be used to determine the range of the piston's resting position and that alternate units of measurement may be used to delineate the resting position of the pistons, in other examples.

Further, in some examples, a multi-strike ignition signal may be provided to at least one combustion chamber and associated piston having a resting position less than a threshold value, when measured from TDC, to decrease the start time. The threshold value may be calculated utilizing one or more of the following parameters: engine temperature, MAP, and throttle position. Likewise a multi-strike ignition signal may be inhibited during a direct-start when all the pistons in the engine have a resting position greater than a threshold value. The multi-strike ignition signal is described in more detail herein with regard to FIGS. 3A-3I.

A direct-start may further include synchronization of various systems within the engine to facilitate implementation of a quick and seamless restart after combustion operation within the engine has been discontinued. It will be appreciated that one or more of the fuel delivery system, the ignition system, and the starter motor may be synchronized to facilitate a rapid direct-start. Therefore, starter-motor 223 may be engaged for a duration during a direct-start. In some examples, the duration of starter motor engagement and/or torque supplied by the starter motor may be decreased during a direct-start, when compared to a cold start-up operation when the engine is below a threshold temperature and an operator initiates start-up. Thus, the amount of assistance provided to the engine via the starter motor may be decreased during a direct-start and increased during a cold-start. In one particular example, the starter motor may not be engaged during a direct-start.

FIGS. 3A-3I illustrate various spark ignition signals which may be provided to one or more spark plugs via a control system, such as control system 150, to initiate spark discharge within a combustion chamber, thereby initiating a combustion event. It will be appreciated that a combustion event may include one or more spark discharges (strikes) within a combustion chamber during a combustion stroke. A spark ignition signal may include one or more signal events corresponding to one or more spark discharge events within the combustion chamber.

The following parameters may be used to characterize the signal events and the spark discharge events: amplitude, timing, and duration. The amplitude of the spark ignition signals is shown on the y-axis while the timing of the spark ignition signal is shown on the x-axis. In some examples, the timing of the spark ignition signals may correspond to specified crank angles. In other examples, alternate units of measurement may be used to delineate the timing of the spark ignition signals. Still further in other examples, the y-axis may represent the energy provided to the combustion chamber via a suitable ignition system. It will be appreciated that a multitude of spark ignition signals may be provided to one or more spark plug and the following spark ignition signals are exemplary in nature.

Figure 3A:
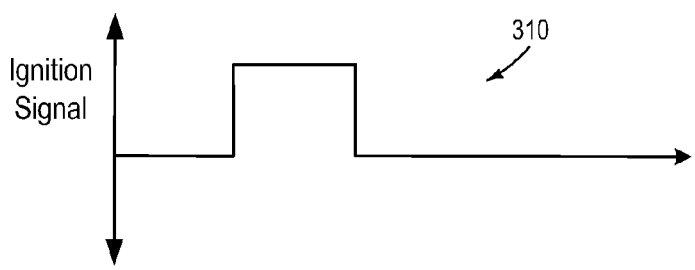
FIGS. 3A-3I illustrate various graphical depictions of spark ignition signals which may be provided to one or more spark plugs included in the internal combustion engine, illustrated in FIGS. 1 and 2.

Specifically, FIG. 3A illustrates a single strike ignition signal 310 which may be provided to one or more spark plugs during operation of the engine, such as when the engine is producing motive power for a vehicle. Additionally or alternatively, spark ignition signal 310 may be provided to one or more spark plugs during an engine-start, which may be operator initiated. An engine-start may include a starting operation utilizing a starter-motor which precedes an engine shut-down. In one example, the engine-start may be a cold-start. The cold-start may be implemented when the engine temperature is below or approaching a threshold value. The threshold value may be calculated utilizing one or more of the following parameters: ambient temperature, fuel rail pressure, and fuel injection timing, fuel composition, and manifold air pressure. However in other examples, the cold-start may be implemented when a pre-determined duration of time has occurred subsequent to an engine shut-down event.

The air-fuel mixture within the combustion chamber may be improperly mixed during a direct-start. In particular, a region having an air fuel ratio facilitating efficient combustion (e.g. a substantially stoichiometric region) may not be adjacent to an ignition point (i.e. an end of the spark plug), due to the piston's close proximity to TDC, as discussed above. Specifically, the substantially stoichiometric region may move past the ignition point. Therefore, consistent ignition of the air-fuel mixture may be difficult when a single spark is discharged within the combustion chamber. Consequently, a multi-strike ignition signal may be provided to the combustion chamber to facilitate consistent ignition of the stoichiometric region, thereby increasing the efficiency of combustion as well as reducing the variations in the toque output and the NVH within the vehicle.

FIGS. 3B-3I illustrate various multi-strike ignition signals which may be provided to one or more spark plugs coupled to a single combustion chamber, during a direct-start. The multi-strike ignition signal may include two or more signal events for a given combustion cycle of a cylinder, where the signal events may include a duration in which charge is released from the spark plug. Likewise, the signal events may correspond to two or more spark discharge events implemented within the combustion chamber via one or more spark plugs. It will be appreciated that a multi-strike operation may include discharging two or more spark events within the combustion chamber per combustion cycle. Furthermore, a fuel injection event and/or starter motor engagement may be coordinated with the multi-strike ignition signal to facilitate complete and efficient combustion within the combustion chamber. Additionally, in some examples, the multi-strike ignition signal, fuel injector event, and/or starter motor engagement may be coordinated to reduce and possibly minimize the start time. It will be appreciated that duration of starter motor engagement during a direct-start may be less than the duration of starter engagement during an engine start in which a single spark ignition signal is used. However, in other examples, the start-motor may not be engaged during a direct-start.

In some examples, a multi-strike ignition signal may be provided to a selected spark plug and therefore combustion chamber for a single combustion cycle. However, it will be appreciated that the multi-strike ignition signals may be repeatedly provided to a selected combustion chamber for two or more combustion cycles. The selected spark plug and combustion chamber may correspond to a first firing combustion chamber from rest during a direct-start. The selection of the combustion chamber may be based on the resting position of the piston within the combustion chamber, as discussed above. However, it will be appreciated that alternate techniques may be used to select the combustion chamber, in other examples. Still further, in other examples, the multi-strike ignition signals may be provided to other combustion chambers during a direct-start and/or may be provided for a least two complete combustion cycles during a direct-start.

Furthermore, the quantity, timing (e.g. the timing of the first spark discharge event), and/or duration of the signal events included in the multi-strike ignition signal may be adjusted based on the resting position of the piston within the combustion chamber, the configuration of the fuel delivery system, such as the fuel rail pressure, the engine temperature, and/or the configuration of the transmission. In some examples, the timing of the first ignition event may be adjusted. It will be appreciated that the aforementioned variables (e.g. quantity, timing, and duration of the signal events) may be correspondingly adjusted to achieve a desired multi-strike ignition signal (e.g. multi-strike profile), facilitating reliable and efficient combustion. In this way, the likelihood of inefficient combustion may be reduced, which may in turn decrease emissions as well as decrease the number of misfires, thereby decreasing NVH within the vehicle and increasing customer satisfaction.

Figure 3B:
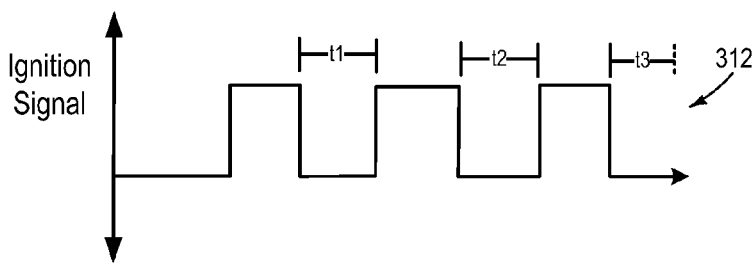
Figure 3C:
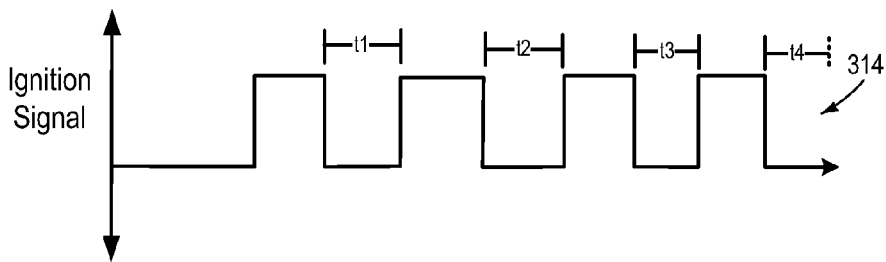

Specifically, the quantity of the spark discharge events may inversely correspond to a resting position of a piston {e.g. the distance of the piston from the top dead center (TDC)} within the selected combustion chamber. Additionally the timing of the first spark discharge event may be adjusted (e.g. retarded or advanced) based on the resting position of the piston. The resting position of the piston may be determined prior to a direct-start when the speed of the piston is below a threshold value (e.g. at rest), prior to engagement of a starter-motor, a fuel injection event, and/or an ignition event, as discussed above. Therefore, in some examples, as depicted in FIGS. 3B and 3C, the quantity of the spark discharge events may be increased as the resting position of the piston, relative to TDC, decreases, the decrease calculated between at least two direct-starts. Furthermore, the first spark discharge event may be retarded as the position of the piston decreases, the decrease calculated between at least two direct-starts.

In particular, FIG. 3B illustrates a multi-strike ignition signal 312 which may be delivered to a selected combustion chamber for a single combustion event including a piston, during a first direct-start. The multi-strike ignition signal includes discharge durations denoted by t1, t2, and t3. The piston may have a substantially static position relative to the TDC of the combustion chamber prior to rotation of the crankshaft, in some examples. However, in other examples, the position of the piston may be measured at a specific time interval while the piston is in motion. It will be appreciated that the crank angle may be used to characterize the piston's position. However, in other examples alternate units of measurements may be used to characterize the piston's position.

FIG. 3C illustrates a multi-strike ignition signal 314 which may be delivered to a selected combustion chamber including a piston, during a second direct-start. The multi-strike ignition signal includes discharge durations denoted by t1, t2, t3, and t4. Additionally, the piston may have a substantially static position relative to the TDC of the combustion chamber prior to rotation of the crankshaft, in some examples. The position of the piston, which may be determined prior to rotation of the crankshaft, corresponding to FIG. 3B may be closer to the TDC than the position of the piston, which may be determined prior to rotation of the crankshaft, corresponding to FIG. 3C. Thus, the quantity of the spark discharge events may be increased as the position of the piston, relative to TDC, decreases, the decrease calculated between at least two direct-starts.

Figure 3D:
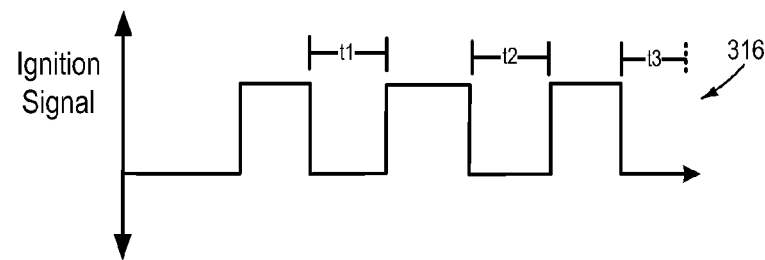
Figure 3E:
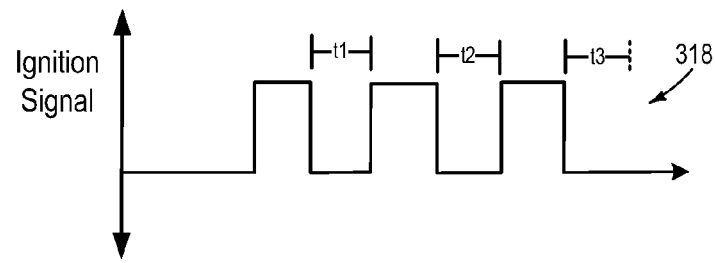

Furthermore, the temperature of the engine may inversely correspond to the duration of the spark discharge events. Therefore in one example, as depicted in FIGS. 3D-3E, the duration of the spark discharge events may be decreased when the temperature of the engine is increased, the increase in temperature calculated between at least two direct-starts. In particular FIG. 3D illustrates a multi-strike ignition signal 316 which may be delivered to a selected combustion chamber while the engine is at a first temperature, during a first direct-start. Likewise, FIG. 3E shows a multi-strike ignition signal 318 which may be delivered to a selected combustion chamber while the engine is at a second temperature, which is greater than the first temperature, during a second direct-start. It will be appreciated that the engine temperature may be determined prior to the multi-strike discharge. Thus, the duration of the spark discharge events may be decreased as the temperature of the engine increases or visa-versa. The multi-strike ignition signal includes discharge durations denoted by t1, t2, and t3, for both FIGS. 3D and 3E.

Figure 3F:
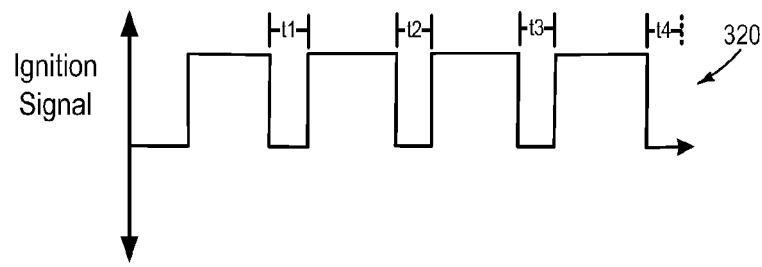
Figure 3G:
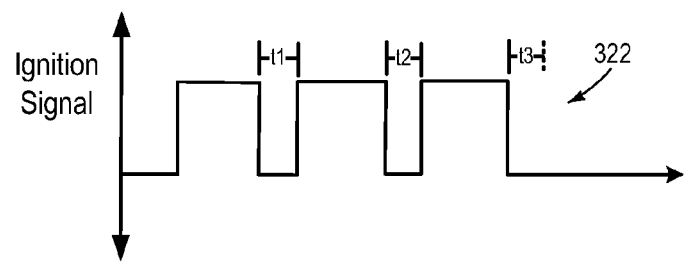

Additionally, the fuel rail pressure may inversely correspond to the quantity of the spark discharge events. Therefore, in one example, as depicted in FIGS. 3F and 3G, the quantity of the spark discharge events may be decreased in response to an increase fuel rail pressure. Specifically, FIG. 3F shows a multi-strike ignition signal 320 which may be delivered a selected combustion chamber within an engine having a first fuel rail pressure during a first direct-start. The multi-strike ignition signal 320 includes discharge durations denoted by t1, t2, t3, and t4.

FIG. 3G illustrates a multi-strike ignition signal 322 which may be delivered a selected combustion chamber within an engine having a second fuel rail pressure, during a second direct-start, the second fuel rail pressure greater than the first fuel rail pressure. The multi-strike ignition signal 322 includes discharge durations denoted by t1, t2, and t3. It will be appreciated that the fuel rail pressure may be measured before, during, and/or after a fuel injection event. Further, in other examples a fuel pressure profile used to determine the characteristics of the multi-strike ignition signal.

Moreover, the duration and the quantity of the spark discharge events may directly correspond to the configuration or temperature of the transmission. The configuration of the transmission may include the arrangement of the gears in the transmission (e.g. gear ratio). Thus, in some examples, the duration and the quantity of the spark discharge events may be increased in response to a decrease in the transmission oil temperature or an adjustment of the transmission into an engaged configuration from a disengaged configuration or visa-versa, as illustrated in FIGS. 3H and 3I.

Figure 3H:
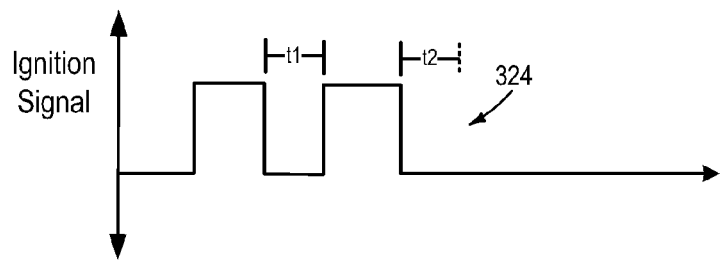
Figure 3I:
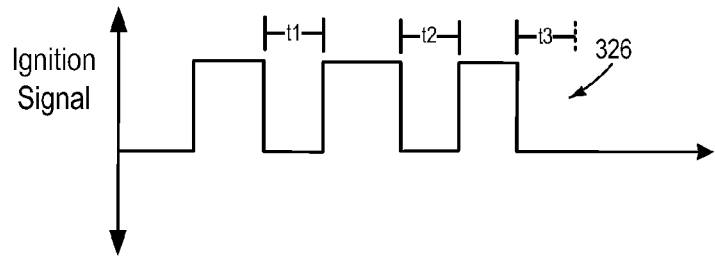

In particular, FIG. 3H illustrates a multi-strike ignition signal 324 which may be delivered to a selected combustion chamber in a vehicle having a transmission in a disengaged configuration and FIG. 3I shows a multi-strike ignition signal 326 which may be delivered to a selected combustion chamber in a vehicle having a transmission in an engaged configuration. The multi-strike ignition signal 324 includes discharge durations denoted by t1 and t2. Likewise the multi-strike ignition signal 326 includes discharge durations denoted by t1, t2, and t3. As depicted, the quantity and the duration of the spark discharge event are increased responsive to a transmission adjustment. It will be appreciated that the transmission may be adjusted (e.g. shifted) into the engaged configuration subsequent to discontinuation of combustion operation within the engine. However, in other examples, the configuration of the transmission may be adjusted prior to discontinuation of combustion operation within the engine.

Furthermore, the multi-strike ignition signal (i.e. quantity, timing, and/or duration of the signal events) may be adjusted based on a combination of the aforementioned parameters: engine temperature, piston position, transmission configuration, and/or fuel rail pressure. For example, the quantity, timing, and/or duration of the signal events included in the multi-strike ignition signal may be adjusted based on a cylinder air charge, to increase the efficiency of the combustion and reduce the variability of combustion. The cylinder air charge is a function of both an initial position of the piston within the combustion chamber and a combustion chamber temperature which corresponds to the engine temperature. In this way, the variation in torque output may be decreased, avoiding possible misfires, decreasing the NVH with the vehicle, and decreasing emission.

Figure 4A:
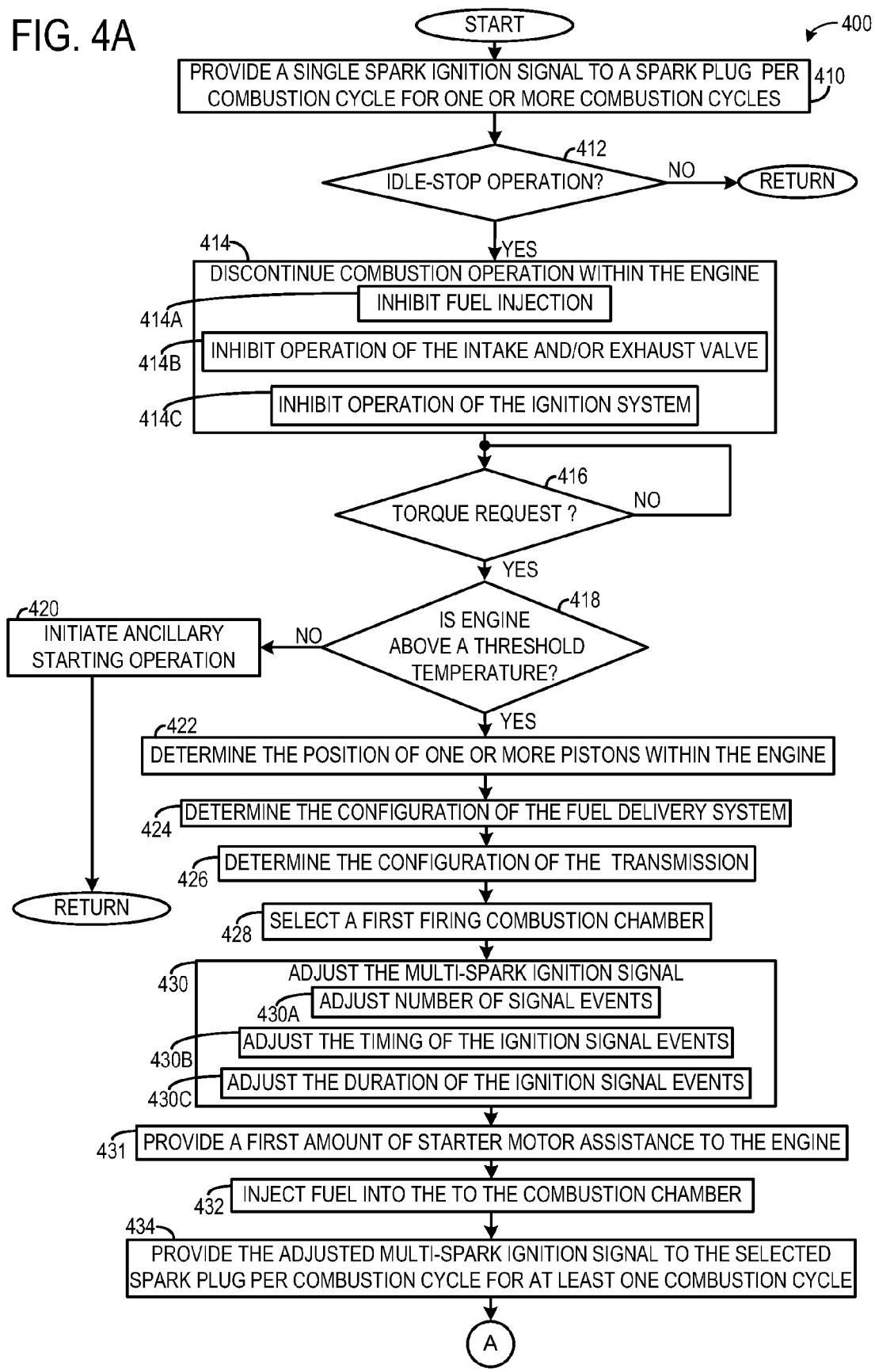

FIGS. 4A and 4B illustrate a control strategy 400 which may be used to initiate combustion within a combustion chamber via a multi-strike discharge, during a direct-start. A direct-start may include a starting event which is initiated after combustion operation has been automatically discontinued in response idle-stop operation. In some examples, control strategy 400 may be implemented utilizing the systems and components, described above. Alternatively, in other examples, control strategy 400 may be implemented utilizing other suitable systems and components.

At 410 control strategy 400 may include providing a single spark ignition signal to a spark plug per combustion cycle for one or more combustion cycles. Next at 412, it is determined if the engine is in idle-stop operation. If it is determined that the engine is not in idle-stop operation, the control strategy may return or alternatively, in other embodiments, the control strategy may end.

However, if the engine is in idle-stop operation combustion operation within the engine is discontinued at 414. Discontinuation of combustion operation may include inhibiting fuel injection at 414A, inhibiting operation of the intake and/or exhaust valve, at 414B, and inhibiting operation of the ignition system at 414C. Inhibiting operation of the intake and/or exhaust valve may include seating and sealing the intake and/or the exhaust valve.

Next at 416 it may be determined if there is a torque request in the vehicle. A torque request may be initiated via an input device, such as an acceleration pedal, in some examples. Additionally or alternatively, it may be determined if an input device (e.g. brake pedal) has been released.

If there has been no torque request made the control strategy returns to 416. However, if a torque request has been made the control strategy may proceed to 418 where it is determined if the engine is above a threshold temperature. One or more of the following parameters may be used to calculate the threshold temperature: ambient temperature, fuel composition, and fuel rail pressure. Additionally or alternatively, it may be determined if a duration following idle-stop operation is below a threshold value. However it will be appreciated that in some examples step 418 may not be included in control strategy 400.

If the engine is not above a threshold temperature the control strategy advances to 420 where an ancillary starting operation is implemented, which may include utilizing a starter-motor for an extended duration of time to initiate combustion operation within the engine, when compared to a direct-start operation. After 420 the control strategy may return to the start or alternatively in other embodiments end.

However, if it is determined that the engine temperature is above a threshold value the control strategy proceeds to 422 where it the position of one or more pistons within the engine is determined. The control strategy then proceeds to 424 where the configuration of the fuel delivery system is determined. In some examples, the fuel rail pressure may be determined at 424. At 426 the configuration of the transmission may be determined. In some examples the configuration of the transmission may include the configuration of a gearbox having an engaged and disengaged configuration. Next, the control strategy advances to 428, where a first firing combustion chamber from rest, subsequent to discontinuation of combustion operation, is selected.

Next, at 430, a multi-strike ignition signal for a single combustion event may be adjusted based on one or more of the following parameters: piston position, engine temperature, fuel rail pressure, and configuration of the transmission. In some examples the configuration of the transmission may include a configuration in which the transmission is engaged or disengaged. In some examples, the control strategy may include at 430A, adjusting the number of signal events and at 430B, adjusting the timing of the ignition signal events. Additionally, the control strategy may include, at 430C, adjusting the duration of the ignition signal events. It will be appreciated that in some example step 430 may not be included in controls strategy 400.

Next, at 431, a first amount of starter motor assistance is provided to the engine. Providing starter motor assistance may include delivery of an amount of energy to a starter motor to enable engagement of the starter motor with a crankshaft, the energy may be provided from an energy storage device, such as a battery. In some examples, the amount of starter motor assistance provided during a direct-start may be less than the amount of starter motor assistance provided during a cold start, which may be operator initiated. Due to the finite amount of available energy in the vehicle, an increased amount of energy may be provided to the ignition system when the amount of starter motor assistance is decreased, facilitating multi-strike ignition operation. Consequently, a multi-spark ignition signal may be provided during a direct-start without decreasing the performance of other vehicle components. However, it will be appreciated that in some examples step 431 may not be included in the control strategy.

Next, at 432, fuel is injected into the combustion chamber. In some examples the fuel may be directly injected into the combustion chamber via a direct injector. Next control strategy 400 proceeds to 434, where the adjusted multi-strike ignition signal is provided to one or more selected spark plug corresponding to the selected combustion chamber for at least one combustion cycle during a direct-start. In this way, a multi-strike ignition operation may be performed per combustion cycle via one or more selected spark plug(s) coupled to the selected combustion chamber for at least a first combustion cycle following a discontinuation of combustion operation during a direct-start.

Next, at 436, it may be determined if the multi-strike ignition operation should be discontinued. Specifically, in some examples, the multi-strike ignition operation may be discontinued after a pre-determined number of combustion cycles (e.g. a single combustion cycle) has been completed. Alternatively, the multi-strike ignition operation may be discontinued subsequent to completion of a direct-start. If it is determined that the multi-strike ignition operation should not be discontinued the control strategy returns to step 434.

However, if it is determined that the multi-strike ignition operation should be discontinued, a single strike ignition signal may be provided to one or more spark plugs per combustion cycle for one or more combustion cycles at 438. In this way, the engine may be started from rest via a single strike ignition operation per combustion cycle.

Next, at 440, it is determined if the engine shut-down has been initiated. In one example, it may be determined if an operator has initiated shut-down of the engine, the engine shut-down initiated via an adjustment of an input device (e.g. ignition switch). If it is determined that the engine shut-down has not been initiated the controls strategy returns to 438. However, if it is determined that engine shut-down has been initiated an engine shut-down may be performed at 442.

Next, at 444, it is determined if start-up operation has been initiated. In one example, it may be determined if a start-up signal from an input device (e.g. ignition switch) has been received. Additionally, in other examples, it may be determined if the temperature of the engine is below a threshold value. The threshold value may be calculated utilizing one or more of the following parameters: fuel composition, ambient temperature, and fuel rail pressure. If it is determined that a start-up operation has not been initiated, control strategy returns to 444.

However, if it is determined that start-up operation has been initiated a second amount of starter motor assistance is provided to the engine, at 446. The second amount of starter motor assistance may be greater than the first amount of starter motor assistance, in some examples. Providing starter motor assistance to the engine may include delivery of energy from a suitable energy storage device, such as a battery, to a starter motor to initiate rotation of a crankshaft via starter motor engagement, in some examples. Next at 448, fuel is injected into at least one combustion chamber and at 450 a single strike ignition signal is provided to at least one combustion chamber per combustion cycle for one or more combustion cycles. In this way, a combustion event including a single strike ignition operation per combustion event may be used to start combustion operation within the vehicle. After 450, control strategy 400 returns to the start.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to I-3, I-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of a vehicle having an engine including a cylinder having a direct fuel injector and a spark plug coupled therein, comprising:
    discontinuing combustion of the engine responsive to idle-stop operation; and
    during a direct-start from engine rest, performing multi-strike ignition operation per combustion cycle via the spark plug for a first firing combustion cycle from rest in the cylinder following the discontinuation of combustion operation.

2. The method of claim 1, wherein the spark plug provides 2 sparks per combustion cycle.

3. The method of claim 2, wherein, before the direct-start, a resting position of a piston within the cylinder is less than a resting position of additional pistons included in the engine, the resting position of the pistons being measured from a top dead center of each cylinder when the pistons were at rest prior to the multi-spark ignition operation.

4. The method of claim 1, further comprising performing a single spark ignition operation per combustion cycle for one or more combustion cycles, preceding the discontinuation of combustion operation.

5. The method of claim 1, further comprising adjusting a quantity, timing, and/or duration of spark ignition events included in the multi-strike ignition operation based a resting position of a piston within the cylinder, the resting position of the piston measured from a top dead center of the cylinder when the piston was at rest prior to the multi-strike ignition operation.

6. The method of claim 5, wherein a quantity of spark discharge events, included in the multi-strike ignition operation, inversely corresponds to resting position of the piston.

7. The method of claim 6, further comprising decreasing a duration of spark discharge events, included in the multi-strike ignition operation, in response to an increase in temperature of the engine.

8. The method of claim 7, further comprising increasing a quantity of spark discharge events, included in the multi-spark ignition operation, in response to a decrease in a fuel rail pressure.

9. The method of claim 8, further comprising increasing the quantity and the duration of the spark discharge events, included in the multi-strike ignition operation, in response to an adjustment of a transmission into an engaged configuration from a disengaged configuration or in response to a decrease in the transmission oil temperature.

10. The method of claim 1, wherein the direct-start is inhibited when a temperature of the internal combustion engine is below a threshold value.

11. The method of claim 1, further comprising directly injecting fuel into the combustion chamber, preceding the multi-strike ignition operation and subsequent to discontinuation combustion operation.

12. A method for operation of a vehicle having an engine including one or more combustion chambers, a fuel delivery system including a direct fuel injector coupled to each combustion chamber, an ignition system including one or more spark plugs coupled to each combustion chamber, a piston disposed within each combustion chamber, and an intake and an exhaust valve coupled to each combustion chamber, the internal combustion engine providing motive power to the vehicle, the method comprising:
    during a first start from engine rest, when a duration following idle-stop operation is below a threshold value, directly starting the engine from rest with a first combustion event including multi-strike ignition operation per combustion event, where a first amount of starter motor assistance to the engine is provided; and
    during a second start from engine rest, when the temperature of the engine is below a threshold value and an operator initiated ignition signal has been received via the vehicle, starting the engine from rest with a second combustion event including only a single strike ignition operation per combustion event, where a second amount of starter motor assistance to the engine is provided, the second of starter motor assistance greater than the first amount of starter motor assistance.

13. The method of claim 12, wherein directly starting the engine includes directly injecting fuel into the combustion chamber, preceding to the first combustion event.

14. The method of claim 12, further comprising adjusting the multi-strike ignition operation, the adjusting including an adjustment of at least one of a quantity, timing, and/or duration of the spark events included in the multi-strike ignition operation based on a resting position of a piston in a combustion chamber carrying out the first combustion event during the direct-start, the resting position measured from the top dead center of the combustion chamber while the piston is at rest prior to the direct-start.

15. The method of claim 12, further comprising adjusting the first combustion event, the adjusting including adjustment of at least one of a quantity, timing, and/or duration of the spark events included in the multi-strike ignition operation.

16. The method of claim 15, wherein the first combustion event is implemented in a combustion chamber having a piston with a resting position less than the resting position of the additional pistons included in the engine, the resting positions of the pistons measured from a top dead center of the combustion chamber while the piston is at rest prior to the multi-spark ignition operation.

17. The method of claim 15, wherein the multi-strike ignition operation is applied to one or more combustion chamber(s) including a piston having a resting position below a threshold value, the resting position of the pistons measured from a top dead center of the combustion chamber while the piston is at rest prior to the multi-spark ignition operation.

18. The method of claim 12, wherein the control system increases a quantity of spark discharge events, included in the multi-strike ignition operation, in response to a decrease in a resting position of the piston within the combustion chamber, the resting position measured from the top dead center of the combustion chamber while the piston is at rest prior to a direct-start, the increase in the quantity of the spark discharge events is adjusted between two or more direct-start.

19. A method for operating an engine cylinder with a direct fuel injector and spark plug coupled therein, comprising:
- during a first start following idle-stop operation, starting the engine from rest with multi-strike ignition operation per combustion event and with a first, lesser, amount of starter motor assistance; and
- during a second start from engine rest, when temperature of the engine is below a threshold value, starting the engine from rest with single-strike ignition operation per combustion event and with a second, greater, amount of starter motor assistance.

* * * * *